(12) United States Patent
Sutardja

(10) Patent No.: US 7,982,998 B1
(45) Date of Patent: *Jul. 19, 2011

(54) COMMUNICATIONS CHANNEL WITH PROGRAMMABLE COUPLING

(75) Inventor: Pantas Sutardja, Los Gatos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/772,615

(22) Filed: May 3, 2010

Related U.S. Application Data

(63) Continuation of application No. 12/288,229, filed on Oct. 17, 2008, now Pat. No. 7,710,679, which is a continuation of application No. 11/185,563, filed on Jul. 20, 2005, now Pat. No. 7,440,209.

(60) Provisional application No. 60/653,384, filed on Feb. 15, 2005, provisional application No. 60/686,098, filed on Jun. 1, 2005.

(51) Int. Cl.
G11B 5/02 (2006.01)
G11B 5/09 (2006.01)
G11B 20/10 (2006.01)

(52) U.S. Cl. .............. 360/67; 360/39; 360/46

(58) Field of Classification Search .......... None
See application file for complete search history.

(56) References Cited

U.S. PATENT DOCUMENTS

| | | | |
|---|---|---|---|
| 5,233,482 A | 8/1993 | Galbraith et al. | |
| 5,463,603 A | 10/1995 | Petersen | |
| 5,745,978 A | 5/1998 | Aboaf et al. | |
| 5,831,456 A | 11/1998 | Sutardja | |
| 5,920,449 A | 7/1999 | Tagawa | |
| 5,933,299 A | 8/1999 | Tanaka et al. | |
| 5,995,313 A | 11/1999 | Dakroub | |
| 6,005,726 A | 12/1999 | Tsunoda | |
| 6,040,953 A | 3/2000 | Malone et al. | |
| 6,101,054 A | 8/2000 | Tsunoda | |
| 6,104,557 A | 8/2000 | Kasai et al. | |
| 6,119,261 A | 9/2000 | Dang et al. | |
| 6,130,791 A | 10/2000 | Muto | |
| 6,130,793 A | 10/2000 | Ohmori et al. | |
| 6,133,784 A | 10/2000 | Gregoire | |
| 6,137,643 A | 10/2000 | Flynn | |
| 6,147,825 A | 11/2000 | Alini et al. | |
| 6,147,827 A | 11/2000 | Southerland et al. | |
| 6,212,047 B1 | 4/2001 | Payne et al. | |
| 6,414,806 B1 | 7/2002 | Gowda et al. | |
| 6,469,856 B1 | 10/2002 | Mitchell et al. | |
| 6,501,610 B1 | 12/2002 | Sugawara et al. | |
| 7,035,030 B2 | 4/2006 | Takayoshi et al. | |
| 7,142,380 B2 | 11/2006 | Ueno | |
| 7,440,209 B1 | 10/2008 | Sutardja | |
| 2002/0060869 A1 | 5/2002 | Sawaguchi et al. | |
| 2005/0232018 A1 | 10/2005 | Dolan et al. | |

(Continued)

OTHER PUBLICATIONS

S. Khizroev and D. Litvinov; Perpendicular magnetic recording: Writing process; Applied Physics Reviews—Focused Review; May 1, 2005; vol. 95, No. 9, pp. 4521-4537.

(Continued)

*Primary Examiner* — Daniell L Negrón

(57) ABSTRACT

A communications circuit includes a first filter having a corner frequency that is adjustable. A data type identifier that tracks first and second types of data flowing through the communications circuit. A control module that adjusts the corner frequency of the first filter to provide alternating current (AC) coupling during the first type of data and adjusts the corner frequency of the first filter to provide direct current (DC) coupling during the second type of data.

20 Claims, 9 Drawing Sheets

U.S. PATENT DOCUMENTS

2005/0251543 A1 11/2005 Hao et al.
2005/0258989 A1 11/2005 Li et al.
2006/0056089 A1 3/2006 Ueno

OTHER PUBLICATIONS

Tom Coughlin, Coughlin Associates; Review of the IDEMA Perpendicular Recording Symposium (2004); 10 pages.

Mike Covault; Perpendicular recording; the next generation of magnetic recording—Tape/Disk/Optical Storage; May 2003; 2 pages.

Wikipedia, the free encyclopedia; Hard disk; Mar. 25, 2005; 8 pages. Chapter 1 Introduction; 14 pages.

USPTO Non-Final Office Action mailed Nov. 26, 2007 for U.S. Appl. No. 11/185,563, filed Jul. 20, 2005.

Amendment filed Feb. 26, 2008 in response to USPTO Non-Final Office Action mailed Nov. 26, 2007 for U.S. Appl. No. 11/185,563, filed Jul. 20, 2005.

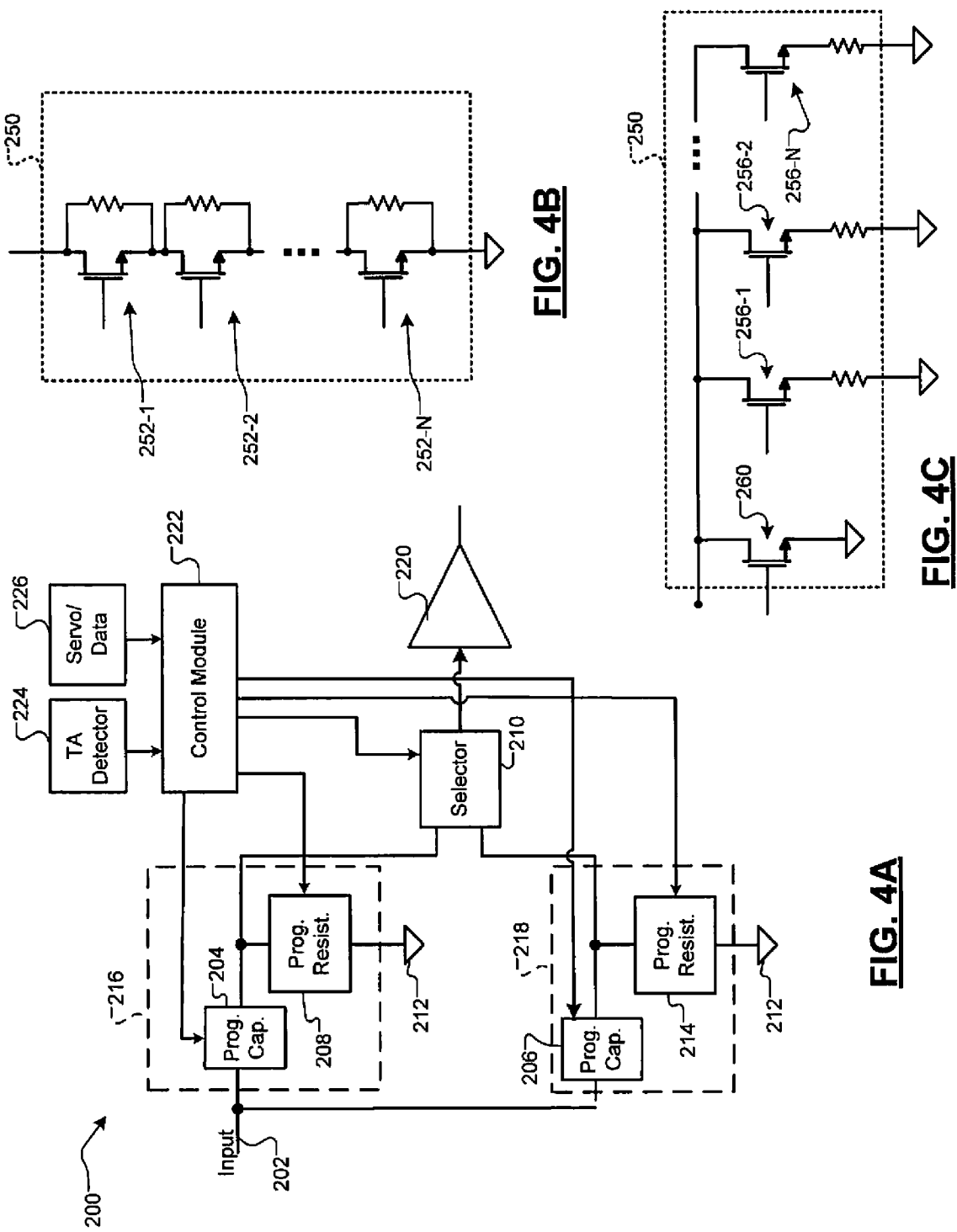

*Mode using one programmable filter*

| | Servo | User Data |
|---|---|---|
| Optimal Channel Characteristic | DC-free or AC coupled | DC coupled |
| Programmable filter | Mode A (Pre or postamble) Sample (Med HP corner during preamble or postamble Then Hold (high R) Mode B High HP corner | Resistance high to provide very low or zero corner and charge retention. |

FIG. 8

*Mode using two programmable filters*

| | Servo | User Data |
|---|---|---|
| Optimal Channel Characteristic | DC-free or AC coupled | DC coupled |
| 1st filter network | Moderate HP corner | Low or DC corner. Hold |
| 2nd filter network | Second moderate corner | Second moderate corner (subject to further change of corner frequency; user choice) |
| Switch position | Select 1st filter network | Select 1st filter network unless Thermal Asperity event – then switch to 2nd and return to 1st after TA event subsides |

FIG. 9

COMMUNICATIONS CHANNEL WITH PROGRAMMABLE COUPLING

CROSS-REFERENCE TO RELATED APPLICATIONS

This application is a continuation of U.S. patent application Ser. No. 12/288,229, filed Oct. 17, 2008, which is a continuation of U.S. patent application Ser. No. 11/185,563 (now U.S. Pat. No. 7,440,209), filed Jul. 20, 2005, which claims the benefit of U.S. Provisional Application Nos. 60/686,098, filed Jun. 1, 2005 and 60/653,384, filed Feb. 15, 2005. The disclosures of the above applications are incorporated herein by reference in their entirety.

FIELD OF THE INVENTION

The present invention relates to programmable DC and AC coupling for communications channels such as hard disk drives.

BACKGROUND OF THE INVENTION

Referring now to FIG. 1, an exemplary magnetic storage system 100, such as a hard disk drive, is shown. A buffer 102 stores data that is associated with control of the hard disk drive. The buffer 102 may employ SDRAM or other types of low latency memory. A processor 104 performs processing that is related to the operation of the hard disk drive. A hard disk controller (HDC) 106 communicates with the buffer 102, the processor 104, a host 108 via an I/O channel 110, a spindle/voice coil motor (VCM) driver 112, and a read/write channel circuit 114.

One or more hard drive platters 116 include a magnetic recording media that stores magnetic fields. The platters 116 are rotated by a spindle motor that is shown schematically at 118. Generally, the spindle motor 118 rotates the hard drive platters 116 at a fixed speed during read/write operations. One or more read/write arm(s) 120 move relative to the platters 116 to read and/or write data to/from the hard drive platters 116. The spindle/VCM driver 112 controls the spindle motor 118, which rotates the platters 116. The spindle/VCM driver 112 also generates control signals that position the read/write arm 120, for example using a voice coil actuator, a stepper motor, or any other suitable actuator.

A read/write device 122 is located near a distal end of the read/write arm 120. The read/write device 122 includes a write element such as an inductor that generates a magnetic field. The read/write device 122 also includes a read element (such as a magneto-resistive (MR) sensor) that senses the magnetic fields on the platter 116. A preamplifier (preamp) circuit 124 amplifies analog read/write signals received from the read/write device 122. When reading data, the preamp circuit 124 amplifies low level signals from the read element and outputs the amplified signal to the read/write channel circuit 114. While writing data, a write current that flows through the write element of the read/write channel circuit 114 is switched to produce a magnetic field having a positive or negative polarity. The positive or negative polarity is stored by the hard drive platter 116 to represent data.

During a write operation, the read/write channel circuit 114 encodes the data to be written onto the storage medium. The read/write channel circuit 114 processes the signal for reliability and may include, for example, error checking and correcting (ECC) coding and run length limited (RLL) coding. During read operations, the read/write channel circuit 114 converts an analog output from the medium to a digital signal. The converted signal is then detected and decoded by known techniques to recover the data written on the hard disk drive.

In longitudinal recording, the read/write device 122 records each bit by magnetizing a portion of the magnetic recording media in the direction that the magnetic recording media rotates. In perpendicular recording, the transducer records data by magnetizing a portion of the magnetic recording media in a direction perpendicular to the rotation of the magnetic recording media. Perpendicular recording channels achieve a higher signal error rate (SER) and thus a lower Bit Error Rate (BER) using a target channel response with a DC term. In longitudinal recording channels, the optimum channel response is DC free. In other words, the channel response has a (1-D) factor.

Conventional channel technologies using AC coupling have been built and optimized for longitudinal recording. DC-coupled channels are difficult to implement. In addition, the performance of longitudinal recording channels are relatively insensitive to a low-to-moderate high-pass corner coupling frequency. Therefore, conventional channels are designed to have AC filters. In FIG. 1, the read/write channel 114 and the preamp 124 are shown to include AC filters 117 and 127 respectively. For perpendicular recording, however, AC coupling causes baseline-wander. The read/write channel for perpendicular recording typically implements a baseline tracking circuit to remove the baseline wander.

Limited bandwidth of the baseline correction loop has placed a practical limitation on the maximum allowed high pass corner of the AC coupling paths. Conventional baseline correction loops typically can handle an AC coupling corner frequency that is about 0.1% to 0.2% of the channel data rate without causing significant BER degradation in the channel.

SUMMARY OF THE INVENTION

A communications circuit comprises a first filter having a first corner frequency that is programmable. A data type identifier tracks first and second types of data flowing through the communications circuit. A control module communicates with the first filter and the data type identifier and adjusts the corner frequency of the first filter based on the first and second types of data.

In other features of the invention, the perpendicular recording system utilizes a DC coupling characteristic during channel decoding of non-(1-D) channel response. The first type of data corresponds to servo data. The control module adjusts the first corner frequency during the first type of data to a first value that samples a DC offset and to a second value that holds the DC offset. The first corner frequency is utilized during at least one of a preamble portion and a postamble portion of the servo data.

In still other features of the invention, the second type of data corresponds to user data. The first filter operates in a DC coupling mode during the second type of data. The first corner frequency is adjustable to provide a sample and hold mode during the first type of data and a DC coupling mode during the second type of data. The first filter comprises a capacitance element that communicates with a programmable resistance element. The first filter comprises programmable capacitance that communicates with a resistance element. The first filter comprises programmable capacitance and resistance elements.

The communications circuit further comprises a second filter having a second corner frequency that is programmable.

A selector has a first input that communicates with the first filter. A second input that communicates with the second filter and an output.

In still other features of the invention, control module communicates with the selector and selects an output of one of the first and second filters using the selector. A thermal asperity detector detects thermal asperity events and generates a thermal asperity signal. The control module selects one of the first and second filters using the selector based on the thermal asperity signal.

In yet other features of the invention, a preamplifier comprises the communications circuit. The first programmable filter is implemented in a preamplifier. A read/write channel comprises the communications. The first programmable filter is implemented in a read/write channel. The first and second programmable filters are connected in series. A switch selectively shorts at least one of the first and second programmable filters.

In still other features of the invention, the control module communicates with the switch and selectively shorts one of the first and second filters using the switch. A hard disk drive comprises the communications circuit.

A method for operating a communications circuit comprises filtering an input signal using a first coupling path having a first corner frequency that is programmable, tracking first and second types of data flowing through the communications circuit, and adjusting the first corner frequency based on the first and second types of data.

In yet other features of the invention, the method comprises utilizing a DC coupling characteristic during channel decoding of non-(1-D) channel response. The first type of data corresponds to servo data. The method comprises adjusting the first corner frequency during the first type of data to a first value that samples a DC offset and to a second value that holds the DC offset. The first value is utilized during at least one of a preamble portion and a postamble portion of the servo data. The second type of data corresponds to user data. The method further comprises operating in a DC coupling mode during the second type of data.

In still other features of the invention, the method comprises adjusting the first corner frequency to provide a sample and hold mode during the first type of data and a DC coupling mode during the second type of data. The method comprises adjusting a capacitance value of a capacitance element to vary the first corner frequency and adjusting a resistance value of a resistance element to vary the first corner frequency. The method comprises adjusting a capacitance value of a capacitance element and a resistance value of a resistance element to vary the first corner frequency.

In still other features of the invention, the method comprises filtering using a second coupling path having a second corner frequency that is programmable. The method comprises selecting an output of one of the first and second coupling paths. The method comprises detecting thermal asperity events and generating a thermal asperity signal. The method comprises selecting one of the first and second coupling paths based on the thermal asperity signal. The first and second coupling paths are connected in series. The method further comprises selectively shorting at least one of the first and second coupling paths.

A communications circuit comprises first filter means for filtering and having a first corner frequency that is programmable. Data type identifying means tracks first and second types of data flowing through the communications circuit. Control means communicates with the first filter means and the data type identifying means and adjusts the corner frequency of the first programmable filter means based on the first and second types of data.

In still other features of the invention, a perpendicular recording system comprises the communications circuit. The perpendicular recording system utilizes a DC coupling characteristic during channel decoding of non-(1-D) channel response. The first type of data corresponds to servo data. The control means adjusts the first corner frequency during the first type of data to a first value that samples a DC offset and to a second value that holds the DC offset. The first value is utilized during at least one of a preamble portion and a postamble portion of the servo data. The second type of data corresponds to user data. The first filter means operates in a DC coupling mode during the second type of data. The first corner frequency is adjustable to provide a sample and hold mode during the first type of data and a DC coupling mode during the second type of data.

In yet other features of the invention, the first filter means comprises capacitance means for providing capacitance that communicates with a programmable resistance means for providing a programmable resistance. The first filter means comprises programmable capacitance means for providing a programmable capacitance that communicates with a resistance means for providing a resistance. The first filter means comprises a programmable capacitance means for providing a programmable capacitance and a programmable resistance means for providing a programmable resistance.

In still other features of the invention, the communication circuit comprises second filter means for filtering and having a second corner frequency that is programmable. Selecting means for selecting has a first input that communicates with the first filter means. A second input that communicates with the second filter means and an output. The control means communicates with the selecting means and selects an output of one of the first and second filter means using the selecting means.

In still other features of the invention, the communications circuit comprises thermal asperity detecting means for detecting thermal asperity events and for generating a thermal asperity signal. The control means selects one of the first and second filter means using the selector based on the thermal asperity signal. A preamplifier comprises the communications circuit. The first programmable filter means is implemented in a preamplifier.

In yet other features of the invention, a read/write channel comprises the communications circuit. The first programmable filter means is implemented in a read/write channel. The first and second programmable filters are connected in series. Switching means selectively shorts at least one of the first and second programmable filter means. The control means communicates with the switching means and selectively shorts one of the first and second filter means using the switching means. A hard disk drive comprises the communications circuit.

A preamplifier and/or read channel circuit comprises a first filter that receives an input signal to the preamplifier and/or read channel circuit and includes a first capacitance element having a first capacitance value and a first resistance element that communicates with the first capacitance element and has a first resistance value. A control module receives a data type signal and changes at least one of the first capacitance value and the first resistance value to adjust a first corner frequency provided by the first filter to alter a coupling characteristic of the first filter.

In yet other features of the invention, the control module adjusts the first corner frequency of the first filter to provide sample and hold modes during a servo data type and a DC coupling mode during a user data type. The perpendicular recording system utilizes a DC coupling characteristic during channel decoding of a non-(1-D) channel response.

In still other features of the invention, the preamplifier and/or read channel circuit further comprises a second filter including a second capacitance element having a second capacitance value and a second resistance element that communicates with the second capacitance element and that has a second resistance value. The first and second filters are connected in parallel. A selector has a first input that communicates with an output of the first filter, a second input that communicates with an output of the second filter and an output. The first and second filters are connected in series. A switch selectively shorts at least one of the first and second filters.

In yet other features of the invention, the control module communicates with the selector and selects the output of one of the first and second filters using the selector. The control module communicates with a switch and selectively shorts one of the first and second filters using the switch. The preamplifier and/or read channel circuit further comprises a thermal asperity detector that detects thermal asperity events and that generates a thermal asperity signal. The control module selects one of the first and second filters using the selector based on the thermal asperity signal. A thermal asperity detector detects thermal asperity events and generates a thermal asperity signal. The control module selectively shorts one of the first and second filters using the switch based on the thermal asperity signal.

A method for operating a preamplifier and/or read channel circuit comprises receiving an input signal to the preamplifier and/or read channel circuit, filtering the input signal using first coupling path including a first capacitance element having a first capacitance value and a first resistance element having a first resistance value. The first capacitance value and the first resistance value define a first corner frequency. The method includes changing at least one of the first capacitance value and the first resistance value based on a data type signal to adjust the first corner frequency.

In still other features of the invention, the method further comprises adjusting the first corner frequency to provide sample and hold modes during a servo data type and a DC coupling mode during a user data type. The method comprises utilizing a DC coupling characteristic during channel decoding of a non-(1-D) channel response. The method comprises selectively filtering the input signal using a second coupling path including a second capacitance element having a second capacitance value and a second resistance element that has a second resistance value. The method comprises connecting the first and second coupling paths in parallel and selecting one of the first and second coupling paths.

In yet other features of the invention, the method further comprises connecting the first and second coupling paths in series and selectively shorting at least one of the first and second filters coupling paths. The method comprises detecting thermal asperity events, generating a thermal asperity signal, and selecting one of the first and second coupling paths using the selector based on the thermal asperity signal. The method further comprises detecting thermal asperity events, generating a thermal asperity signal, and selectively shorting one of the first and second coupling paths based on the thermal asperity signal.

A preamplifier and/or read channel circuit comprises first filter means that filters an input signal to the preamplifier and/or read channel circuit and includes first capacitance means that provides a first capacitance value and first resistance means that communicates with the first capacitance means and that provides a first resistance value. Control means receives a data type signal and changes at least one of the first capacitance value and the first resistance value to adjust a first corner frequency provided by the first filter means to alter a coupling characteristic of the first filter means.

In still other features of the invention, the control means adjusts the first corner frequency of the first filter means to provide sample and hold modes during a servo data type and a DC coupling mode during a user data type. The perpendicular recording system utilizes a DC coupling characteristic during channel decoding of a non-(1-D) channel response. The preamplifier and/or read channel circuit comprises second filter means for filtering that includes second capacitance means for providing a second capacitance value and second resistance means that communicates with the second capacitance means for providing a second resistance value.

In yet other features, the first and second filter means are connected in parallel. Selecting means for selecting has a first input that communicates with an output of the first filter means, a second input that communicates with an output of the second filter means and an output. The first and second filter means are connected in series. Switching means selectively shorts at least one of the first and second filter means. The control means communicates with the selecting means and selects the output of one of the first and second filter means using the selecting means. The control means communicates with the switching means and selectively shorts one of the first and second filter means using the switching means.

In still other features of the invention, the preamplifier and/or read channel circuit further comprises thermal asperity detecting means for detecting thermal asperity events and for generating a thermal asperity signal. The control means selects one of the first and second filter means using the selecting means based on the thermal asperity signal. The preamplifier and/or read channel circuit comprises thermal asperity detecting means for detecting thermal asperity events and for generating a thermal asperity signal. The control means selectively shorts one of the first and second filter means using the switching means based on the thermal asperity signal.

A preamplifier and/or read channel circuit for a perpendicular recording system comprises a first filter having a first corner frequency that is programmable. A second filter has a second corner frequency. A control module receives a data type signal and selectively applies an input signal to the preamplifier and/or read channel circuit to at least one of the first and second filters based on the data type signal and that selectively adjusts the first corner frequency of the first filter.

In other features of the invention, the first filter comprises a first capacitance element having a first capacitance value and a first resistance element that communicates with the first capacitance element and that has a first resistance value. The second filter comprises a second capacitance element having a second capacitance value and a second resistance element that communicates with the second capacitance element and that has a second resistance value. The data type signal identifies first and second types of data. The first type of data corresponds to servo data. The control module adjusts the first corner frequency during the first type of data to a first value that samples a DC offset and to a second value that holds the DC offset.

In yet other features of the invention, the first value is utilized during at least one of a preamble portion and a postamble portion of the servo data. The second type of data corresponds to user data. The first filter operates in a DC coupling mode during the second type of data. The first corner frequency is adjusted by the control module to provide a sample and hold mode during a first type of data and a DC coupling mode during a second type of data.

In still other features of the invention, a selector has a first input that communicates with the first filter, a second input that communicates with the second filter and an output. The control module communicates with the selector and selects an output of one of the first and second filters using the selector. The preamplifier and/or read channel circuit comprises a thermal asperity detector that detects thermal asperity events and that generates a thermal asperity signal. The control module selects one of the first and second filters using the selector based on the thermal asperity signal. A switch selectively shorts one of the first and second filters. The control module communicates with the switch and shorts one of the first and second filters using the switch.

In yet other features of the invention, a thermal asperity detector that detects thermal asperity events and that generates a thermal asperity signal. The control module shorts one of the first and second filters using the selector based on the thermal asperity signal. A hard disk drive comprises the preamplifier and/or read channel circuit. An integrated circuit comprises the preamplifier and/or read channel circuit and further comprises an input pin. The data type signal is received on the input. The input pin is used for another purpose during write operations. The input pin is a write data pin.

A method for operating a preamplifier and/or read channel circuit for a perpendicular recording system comprises selectively filtering an input signal to the preamplifier and/or read channel circuit using a first coupling path having a first corner frequency that is programmable; selectively filtering the input signal using a second coupling path having a second corner frequency; receiving a data type signal; selectively applying the input signal to the preamplifier and/or read channel circuit to at least one of the first and second coupling paths based on the data type signal; and selectively adjusting the first corner frequency of the first coupling path.

In still other features of the invention, the method comprises utilizing a DC coupling characteristic during channel decoding of non-(1-D) channel response. The data type signal identifies first and second types of data. The first type of data corresponds to servo data. The method comprises adjusting the first corner frequency during the first type of data to a first value that samples a DC offset and to a second value that holds the DC offset. The method comprises utilizing the first value during at least one of a preamble portion and a postamble portion of the servo data. The second type of data corresponds to user data. The method comprises operating in a DC coupling mode during the second type of data. The method comprises adjusting the first corner frequency to provide a sample and hold mode during a first type of data and a DC coupling mode during a second type of data.

In yet other features of the invention, the method comprises selecting an output of one of the first and second coupling paths. The method comprises detecting thermal asperity events and generating a thermal asperity signal. The method comprises selecting one of the first and second filters based on the thermal asperity signal. The method further comprises selectively shorting one of the first and second coupling paths.

The method comprises integrating the preamplifier and/or read channel circuit in an integrated circuit having an input pin and receiving the data type signal on the input pin. The input pin is used for another purpose during write operations. The input pin is a write data pin.

A preamplifier and/or read channel circuit for a perpendicular recording system comprises first filter means for providing a first coupling path and having a first corner frequency that is programmable. Second filter means provides a second coupling path and has a second corner frequency. Control means receives a data type signal and selectively applies an input signal to the preamplifier and/or read channel circuit to at least one of the first and second coupling paths based on the data type signal and selectively adjusts the first corner frequency of the first filter means.

In yet other features of the invention, the first filter means comprises first capacitance means for providing a first capacitance value and first resistance means that communicates with the first capacitance means for providing a first resistance value. The second filter means comprises second capacitance means for providing a second capacitance value and second resistance means that communicates with the second capacitance means for providing has a second resistance value.

In still other features of the invention, the perpendicular recording system utilizes a DC coupling characteristic during channel decoding of a non-(1-D) channel response. The data type signal identifies first and second types of data. The first type of data corresponds to servo data. The control means adjusts the first corner frequency during the first type of data to a first value that samples a DC offset and to a second value that holds the DC offset. The first value is utilized during at least one of a preamble portion and a postamble portion of the servo data. The second type of data corresponds to user data. The first filter means operates in a DC coupling mode during the second type of data. The first corner frequency is adjusted by the control means to provide a sample and hold mode during a first type of data and a DC coupling mode during a second type of data.

In yet other features of the invention, the preamplifier and/or read channel circuit further comprises selecting means for selecting and having a first input that communicates with the first filter means, a second input that communicates with the second filter means and an output. The control means communicates with the selecting means and selects an output of one of the first and second filter means using the selecting means. The preamplifier and/or read channel circuit further comprises thermal asperity detecting means for detecting thermal asperity events and for generating a thermal asperity signal. The control means selects one of the first and second filter means using the selector based on the thermal asperity signal.

In still other features of the invention, the preamplifier and/or read channel circuit further comprises switching means for selectively shorting one of the first and second filter means. The control means communicates with the switching means and selectively shorts one of the first and second filter means using the switching means. Thermal asperity detecting means detects thermal asperity events and generates a thermal asperity signal.

In yet other features of the invention, the control means shorts one of the first and second filter means using the selecting means based on the thermal asperity signal. A hard disk drive comprises the preamplifier and/or read channel circuit. An integrated circuit comprises the preamplifier and/or read channel circuit and further comprises an input pin. The data type signal is received on the input and wherein the input pin is used for another purpose during write operations. The input pin is a write data pin.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4A is a more detailed functional block diagram of exemplary AC/DC coupling device according to the present invention;

FIG. 4B is a schematic diagram of one exemplary programmable resistance;

FIG. 4C illustrates is a schematic diagram of a second exemplary programmable resistance;

FIG. 8 illustrates operation of the AC/DC coupling using a single programmable filter according to one implementation;

FIG. 9 illustrates operation of the AC/DC coupling using two programmable filters according to another implementation.

DETAILED DESCRIPTION OF THE PREFERRED EMBODIMENTS

Figure 1:
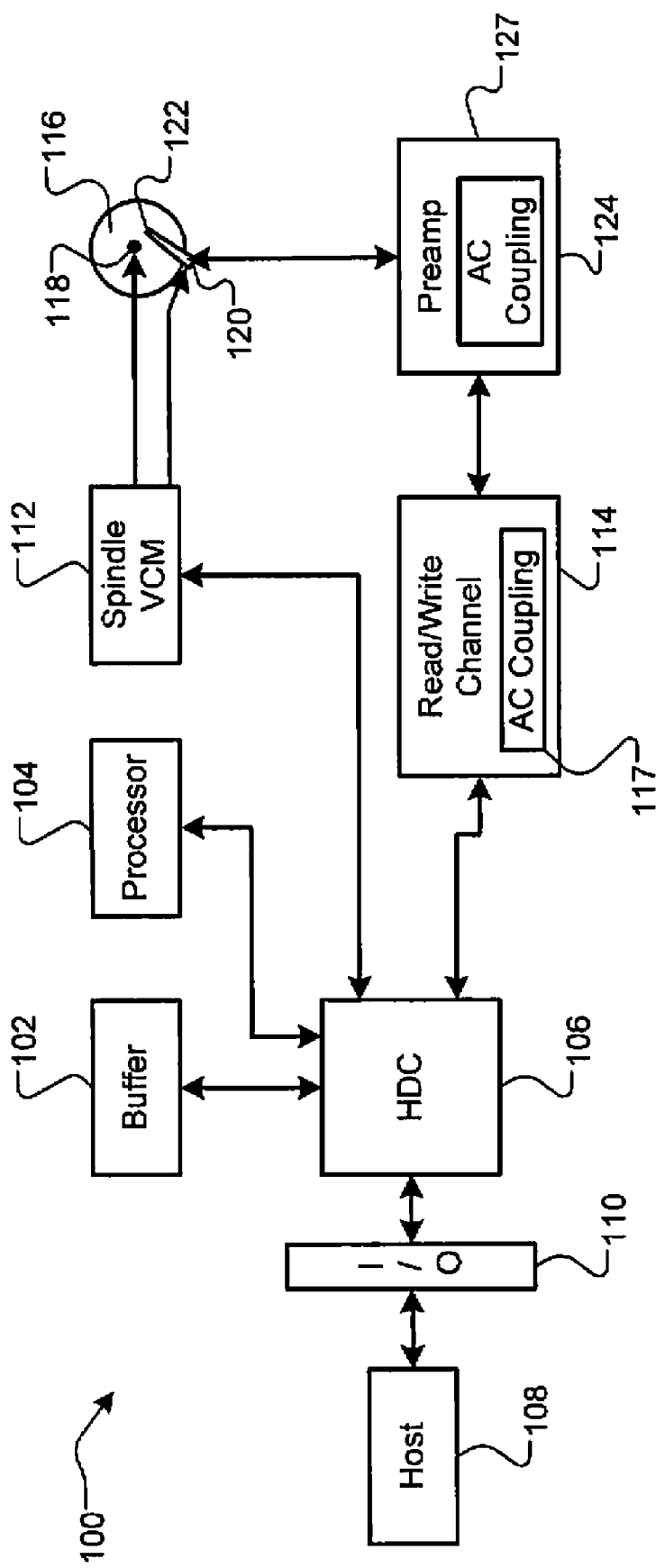
FIG. 1 is a functional block diagram of exemplary magnetic storage system according to the prior art.

The following description of the preferred embodiments is merely exemplary in nature and is in no way intended to limit the invention, its application, or uses. For purposes of clarity, the same reference numbers will be used in the drawings to identify similar elements. As used herein, the term module, controller and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 2:
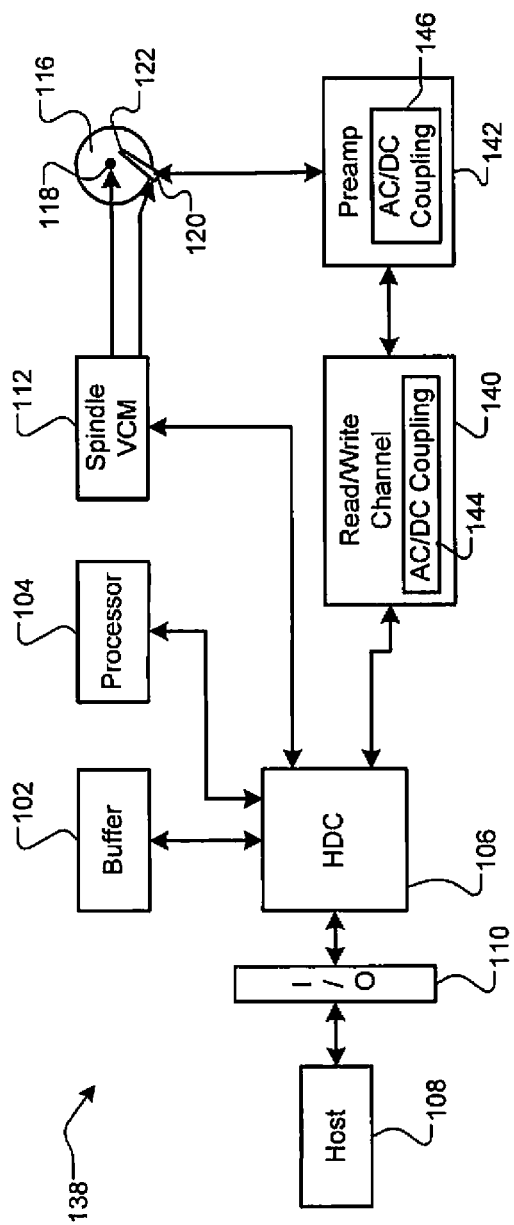
FIG. 2 is a functional block diagram exemplary magnetic storage system according to the present invention.

Referring now to FIG. 2, an exemplary magnetic storage system 138 according to the present invention is shown. AC filters 117 and 127 in the read/write channel 114 and/or preamp 124 in FIG. 1 are replaced by programmable AC/DC filters 144 and 146 in a read/write channel 140 and/or a preamp 142. The AC/DC filters 144 and 146 allow the channel characteristic to be adjusted between sample, hold (or DC-coupled), and DC-free channel characteristics depending upon the data flowing through the channel and/or the presence or absence of thermal asperity, as will be described further below.

In most magnetic hard disk drives, each sector includes servo data and user data. The servo data includes a preamble portion, a data portion, a postamble portion, and/or other data portions. During the preamble and/or postamble portions, a fixed frequency signal may occur. Typically the fixed frequency signal has a lower frequency than a frequency of data in the user data portion. The channel encoding scheme is often different for the servo data portion and the user data portion. As a result, the optimum channel responses for the servo and user data portions may differ. State of the art servo channels, even in perpendicular recording systems, are DC free (in other words, they have channel response with a 1-D factor), which implies that the channel should be AC coupled. Meanwhile, perpendicular recording of user data benefits from DC coupling. An optimum recording channel would thus work in different modes, depending on whether servo data or user data is being recorded.

There are at least two AC filters in the channel path for conventional recording channels: at least one in the preamplifier IC and one in the read channel IC. Since most circuits typically have some DC offset, whether intentional or not, the DC offset should be removed. For most read channel circuits, the use of the AC filter removes these DC offsets. According to the present invention, the same AC filter or network can be used to perform offset sampling, offset hold and DC coupling. For example, a filter acts as a high pass (or AC coupling) filter. By adjusting the value of R, different functions can be achieved with the same capacitive-resistive (C-R) network. When R is low, the filter acts an offset sampler. When R is maximized to minimum leakage, the filter acts as an offset holder. In between these extremes, AC coupling is provided with a programmable high pass corner.

Figure 3A:
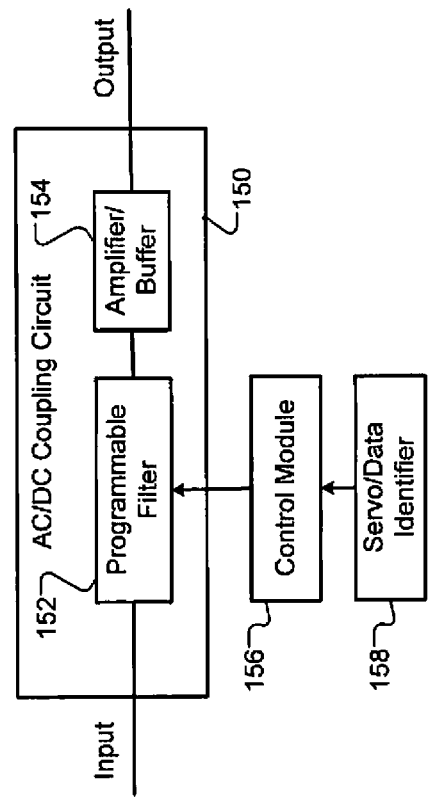
FIG. 3A is a functional block diagram of an exemplary AC/DC coupling device according to the present invention.

Referring now to FIG. 3A, an exemplary AC/DC coupling circuit 150 is shown. The AC/DC coupling circuit 150 includes a programmable capacitive-resistive (C-R) network 152 that is coupled to an input. An amplifier/buffer 154 is coupled to an output of the programmable filter 152. An output is referenced from an output of the amplifier buffer 154. A servo/data identifier module 158 generates a servo/user data signal that identifies at least one of servo data, user data, a preamble and/or a postamble. As can be appreciated, the control module 156 and/or servo/data identifier module 158 may be implemented by other modules within the disk drive system such as, but not limited to, the HDC, read/write channel, preamp, processor and/or other suitable integrated or stand alone modules.

In channels utilizing the filter as a high pass filter, the present invention samples the DC offset using a relatively low value of R. Since the incoming signal fluctuates during the time of the sampling, the high pass corner used for sampling should not have a very high frequency. The high pass corner should be high enough to achieve a short sampling period, but should not be higher than the frequency of the signal during the time of sampling. In some implementations, the signal is sampled in a preamble or post-amble of the servo data signal (when the signal is known to have a certain frequency). After the sampling, the value of R is significantly increased to a higher or maximum value to achieve near perfect charge holding in the capacitor and to provide the DC coupling function for the channel.

Figure 3B:
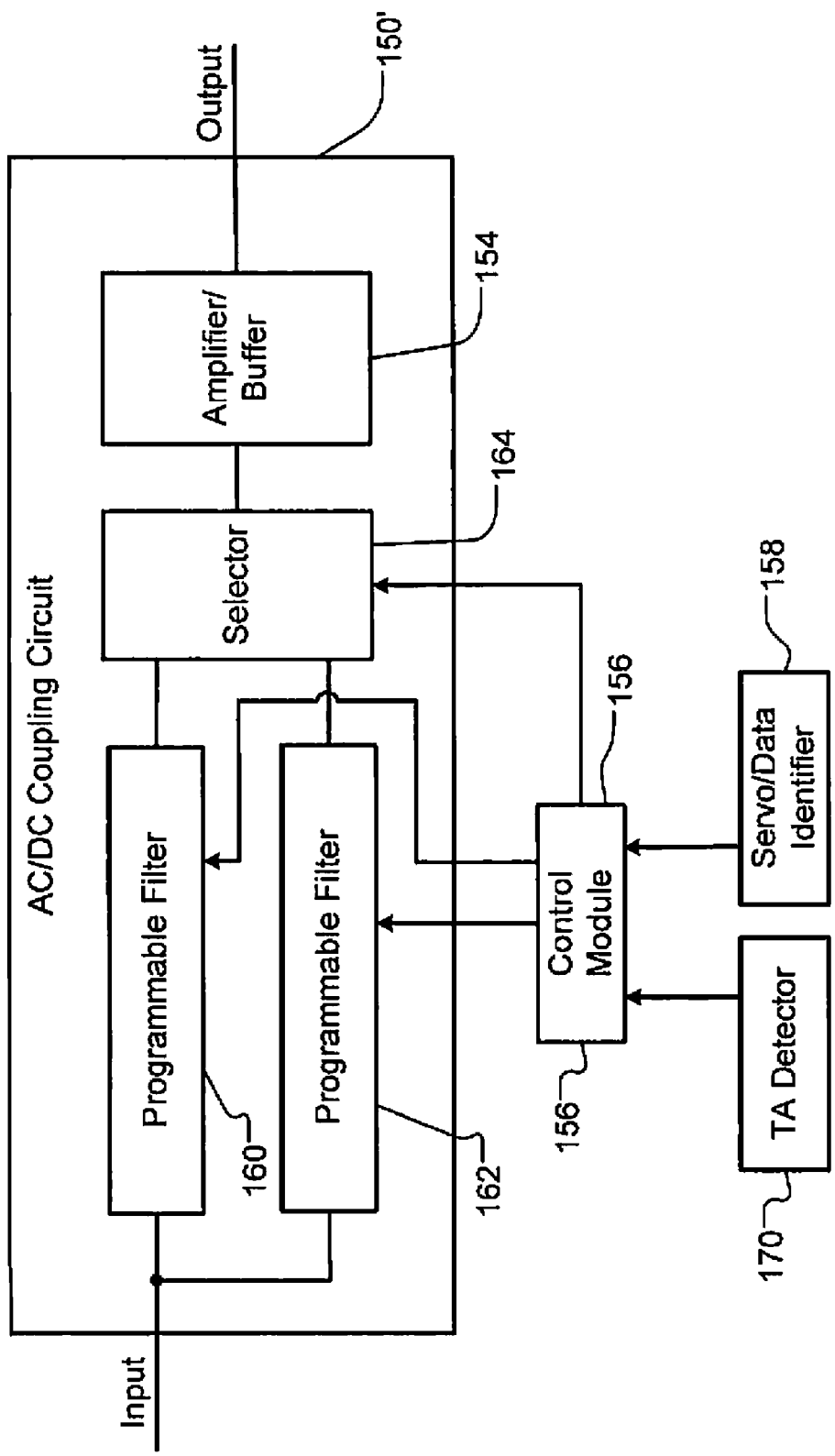
FIG. 3B is a functional block diagram of another exemplary AC/DC coupling device according to the present invention.

Referring now to FIG. 3B, to maximize flexibility, the present invention also provides for an AC/DC coupling circuit 150' that includes at least two filters connected in parallel. While, the exemplary AC/DC coupling circuit 150' described below includes first and second programmable capacitive-resistive (C-R) networks 160 and 162 that are coupled to an input, at least one of the filters should be programmable. A selector 164 receives outputs of the programmable filters 160 and 162 and selects one for output to the amplifier/buffer 154. The control module 156 receives the servo/data signal that identifies servo, user data, preamble and/or postamble portions of the data flowing in the channel. An optional thermal asperity detector 170 detects thermal asperity events. Thermal asperity occurs when the read head collides with the magnetic medium. Suitable thermal asperity detectors are disclosed in U.S. patent application Ser. No. 09/850,039, filed May 7, 2001, 10/612,400, filed Jul. 2, 2003 and 10/754,325, filed Jan. 9, 2004, which are hereby incorporated by reference.

In use, one filter output is used by the channel at a time. This way, the coupling frequencies can be optimized for different channel responses and switching between the different coupling frequencies will not entail a large settling time. For example, if the servo channel requires a very high pass coupling frequency, one filter can be programmed to have relatively high high-pass corner frequency while the other can be programmed to have a medium high pass corner frequency during offset sampling for the data channel.

In some implementations during servo read, the channel uses the first filter programmed with a very high high-pass corner frequency. The second filter is programmed with a mid-level high-pass corner. The corner frequency of the second filter should be as high as possible without exceeding the frequency of the signal it is trying to sample. The corner frequency of the second filter is tuned to a DC level at the end of offset sampling and maintained for the rest of the data read cycle until the next servo period. During the data read cycle or data mode, the second filter can be maintained at DC coupling, or some corner frequency lower than the servo frequency signal.

In other implementations, the first filter may also be used temporarily during the data mode when a thermal asperity event occurs. Thermal asperity events cause large baseline transients with high DC components, which will cause data errors. When thermal asperity events occur, a higher high-pass corner for the channel is used to remove the baseline transient as quickly as possible. If there is only one filter available to the data channel, the only way to increase the high-pass corner from DC level to a mid-value level is to reduce the value of R. Doing so will help remove the signal transient. However, the correct DC offset "memory" that was stored in the capacitor may be lost and additional problems will be created after the transient has subsided. Having another high-pass filter (in this case the first filter normally used for servo mode) allows for fast switching in a moderately high cornered high-pass filter during the signal transient and switching back to the DC coupling mode when the signal transient has subsided.

On the preamplifier side, the same concept of the filter is used to perform offset sampling and opening up the resistor to hold the offset value. In some implementations, the offset sampling is performed during the servo mode. The high-pass corner frequency should be set to a value lower than the servo signal during the servo period. In some implementations of the present invention, an additional control pin is provided on a preamp IC or input to a preamp module to provide identify a correct time to sample during the servo period. Outside the servo period, leakage paths to the capacitor should be shut off to minimize signal drifting due to changes of charge on the sampling capacitor.

Referring now to FIG. 4A, an electrical diagram of an exemplary coupling device 200 according to the principles of the present invention is presented. An input signal is communicated to a first terminal of a first programmable capacitance 204 and to a first terminal of a second programmable capacitance 206. A second terminal of the first programmable capacitance 204 communicates with a first terminal of a first programmable resistor 208 and with a first terminal of a selector 210. A second terminal of the first programmable resistor 208 communicates with a referencereference potential 212 such as ground potential and/or a reference above or below ground potential. A second terminal of the second programmable capacitance 206 communicates with a first terminal of a second programmable resistor 214 and with a second terminal of the selector 210. In some implementations, the selector 210 may be implemented by transistors. A second terminal of the second programmable resistor 214 communicates with the reference potential 212.

The first programmable capacitance 204 and the first programmable resistor 208 form the first programmable filter 216. The second programmable capacitance 206 and the second programmable resistor 214 form the second programmable filter 218. An output of the selector 210 communicates with an input of a buffer/amplifier stage 220. The buffer stage 220 buffers the signal received and may amplify the signal as well.

The resistance of the programmable resistors 208 and 214 is programmable between a short circuit, one or more non-zero resistances and/or an open circuit. The high-pass corner frequency of an RC filter is equal to $1/(RC)$. By varying the resistance, the high-pass corner frequency of the filter is changed. Because the programmable resistances 208 and 214 are independently programmable, the first programmable filter 216 and the second programmable filter 218 can have different high-pass corner frequencies.

During the servo mode, the first programmable filter 216 is configured with a predetermined high-pass corner frequency for AC coupling during the servo mode. The selector 210 selects the first filter 216. The second programmable filter 218 is configured for sample and hold and DC coupling. DC coupling is achieved when the high-pass corner frequency is zero or a short circuit. This occurs with a very high resistance such as an open circuit. In order to sample a DC offset, for instance in the second programmable filter 218, the resistance of the second programmable resistor 214 is set to zero. The second programmable capacitance 206 is now effectively connected between the input 202 and reference 212. The second programmable capacitance 206 will charge to the level of the input 202. Once the second programmable capacitance 206 has charged, the resistance of the second programmable resistor 214 can be set very high or to an open circuit to prevent leakage from the second programmable capacitance 206. The sampled DC offset voltage of the input signal is now applied across the first programmable capacitance 204.

During the data mode, the second programmable filter 218 then operates in a DC coupling mode, with the first programmable capacitance 204 providing a DC voltage offset. The selector 210 selects the second filter 218. If a thermal asperity event occurs, and a high-pass filter is needed, the first programmable filter 216 can be selected by selector 210 and used without losing the offset voltage applied across the second programmable capacitance 206. Once the thermal asperity transient has subsided, the selector 210 will simply reselect the second programmable filter 218.

In some implementations, the read channel circuit includes an additional pin for receiving the servo/data signal. In other implementations, a pin or port on the read channel circuit that is not used during reading is used to provide the serco/data control signal. For example, a write data pin or port is used to receive the servo/data control signal.

Referring now to FIGS. 4B and 4C, exemplary programmable resistances 250 are shown, although other types of programmable resistances are contemplated. In FIG. 4A, a series approach is shown to include parallel-connected transistor/resistance pairs 252-1, 252-2, . . . , and 252-N that are connected in series. In FIG. 4B, a parallel approach is shown to include series-connected transistor/resistance pairs 256-1, 256-2, . . . , and 256-N that are connected in parallel and a transistor 260. A similar approach can be employed for the programmable capacitance. As can be appreciated, series and parallel combinations of resistances and/or capacitances can be used to provide a variable corner. Alternately, active devices such as transistors can be used to provide variable resistance and/or capacitance. While both the resistance and capacitance are shown as programmable, one or both may be programmable.

Figure 4D:
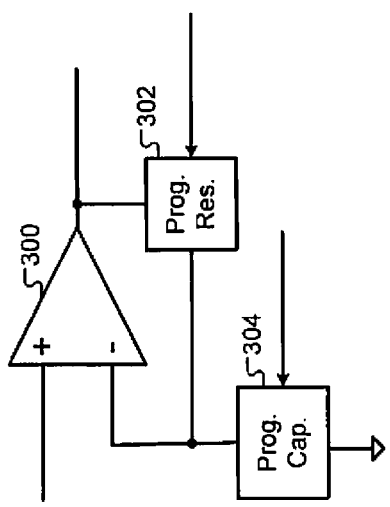
FIG. 4D illustrates a second exemplary programmable filter according to the present invention.

Referring now to FIG. 4D, a second exemplary programmable filter according to the present invention is shown. The second programmable filter includes an opamp 300 having a non-inverting input that communicates with an input signal. An inverting output and an output of the opamp 300 communicate with a programmable resistance 302. The noninverting input communicates with a programmable capacitance 304. As can be appreciated, the resistance and/or capacitance can be varied to adjust the corner from DC, to moderate and/or high corner frequencies. Control signals input to the programmable resistance and/or capacitance adjust the resistance and/or capacitance.

Figure 5:
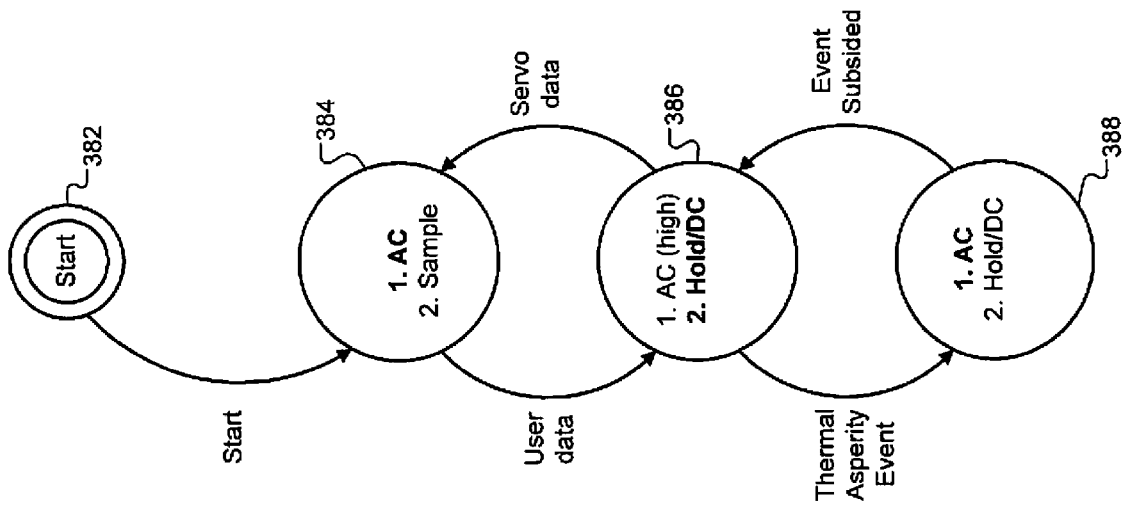
FIG. 5 is an exemplary state diagram of a control module according to the present invention.

Referring now to FIG. 5, an exemplary state diagram according to the principles of the present invention is presented. This exemplary implementation assumes that there are two programmable filters that are selected to communicate with a buffer. Control begins in state 382 and transfers to state 384. In state 384, the second programmable filter is set to sampling mode. The first programmable filter is set to AC coupling with a relatively high corner frequency, and connected to the buffer (connection is indicated in FIG. 5 with bold typeface). When user data is to be handled, control transfers to state 386, where the second filter is placed in DC coupling mode, using the offset voltage sampled in state 384. The second filter is connected to the buffer.

The first filter is set to have an AC coupling corner frequency sufficient to remove the effects of a thermal asperity transient. Control transfers from state 386 to state 388 when a thermal asperity event occurs, or returns to state 384 when servo data is to be handled. In state 388, the first filter is connected to the buffer. This allows the high-pass filter characteristics of the first filter to remove the effects of the thermal asperity event, while preserving the sampled offset of the first programmable filter. When the thermal asperity event has subsided, control returns to state 386. The high pass corner of the first filter may be adjusted to handle the TA event if desired.

Figure 6:
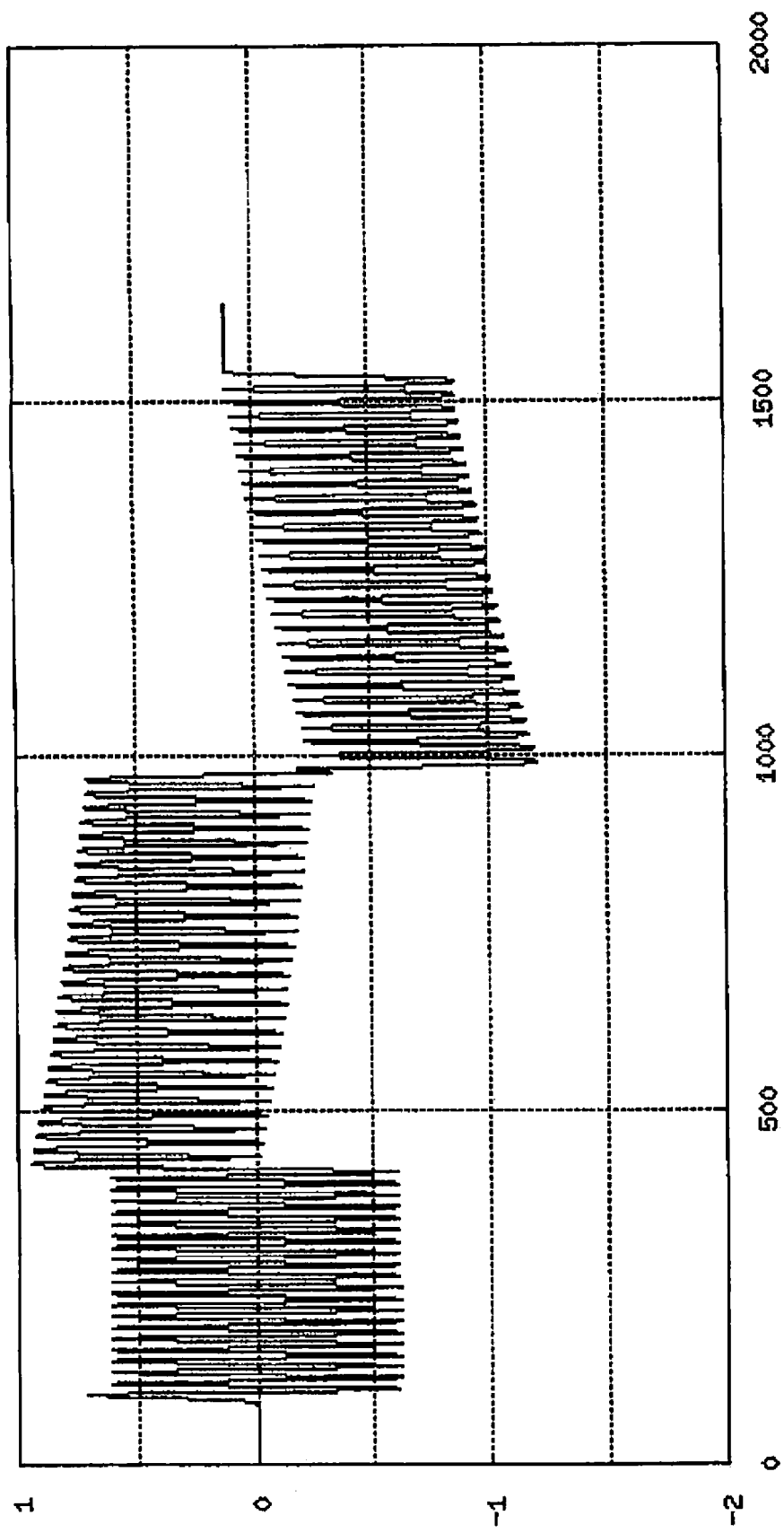
FIG. 6 is a graph illustrating a perpendicular recording waveform with large low-frequency content after being passed by a high pass filter.
Figure 7:
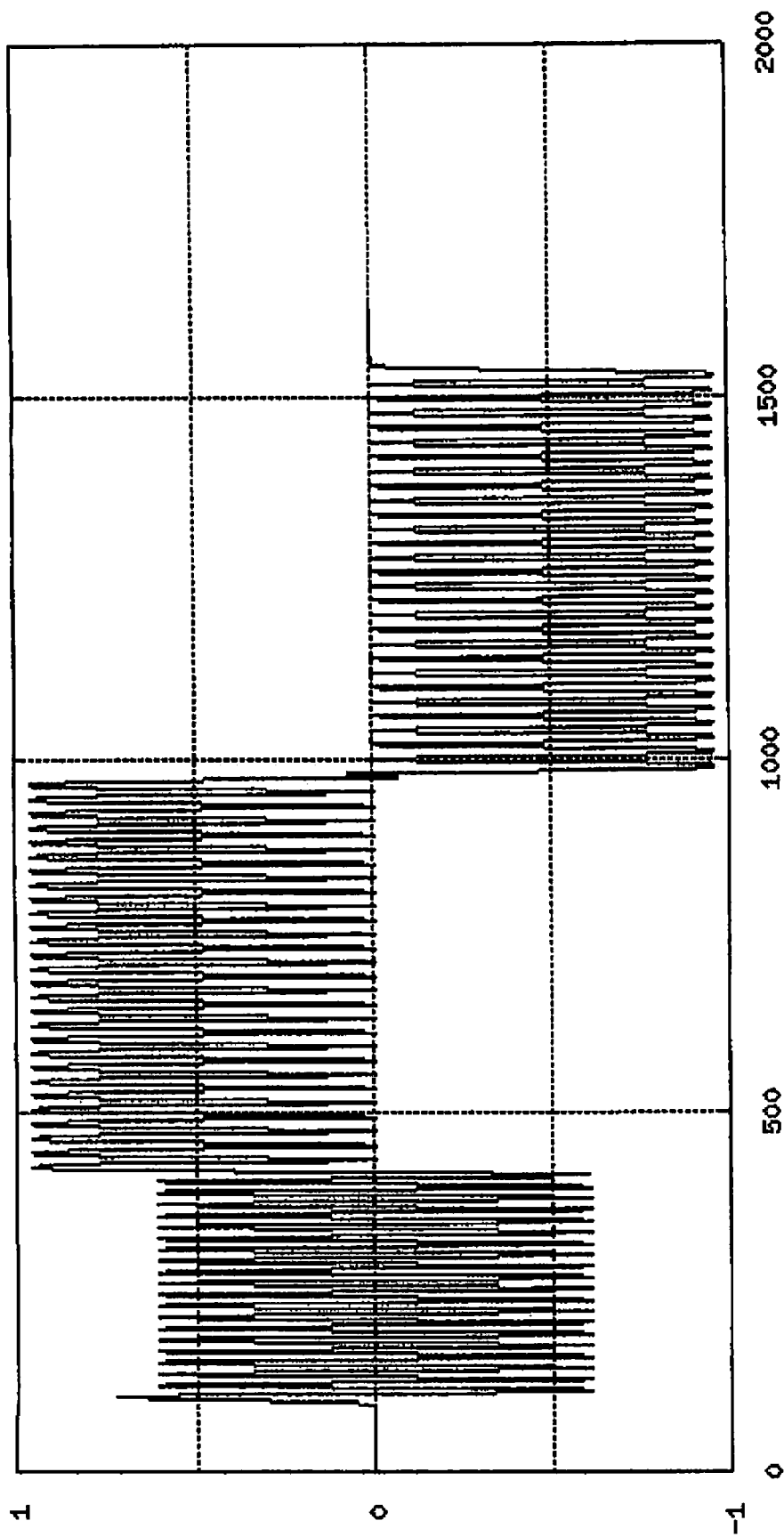
FIG. 7 is a graph illustrating a perpendicular recording waveform with large low-frequency content.

Referring now to FIGS. 6 and 7, exemplary perpendicular recording waveforms are shown. In FIG. 6, a graph illustrating a perpendicular recording waveform with large low-frequency content after being passed by a 0.4% high pass filter is shown. Degradation due to the high pass filter according to the prior art is shown. FIG. 7 is a graph illustrating a perpendicular recording waveform with large low-frequency content and no degradation according to the present invention.

Referring now to FIG. 8, operation of an AC/DC coupling using a single programmable filter according to one implementation is described in further detail. During the servo portion, the optimum channel characteristic is DC-free or AC coupled. During the user data, the channel is DC coupled. The programmable filter has a first mode during the servo portion where sampling occurs followed by a hold mode. During the user data mode, the resistance of the programmable filter remains high to provide charge retention.

Referring now to FIG. 9, operation of an AC/DC coupling using two programmable filters according to another implementation is described in further detail. Similar channel characteristics with respect to FIG. 8 are desired here as well. The first programmable filter is programmed for a moderate HP corner during the servo mode. The second programmable filter has a moderate corner during the servo mode. During the user data mode, the first programmable filter has a hold mode or a low or DC corner for charge retention. The switch selects the first programmable filter during the servo mode. The switch selects the first programmable filter during the user data mode. When a thermal asperity event occurs, the switch selects the second programmable filter and then returns to the first programmable filter after the thermal asperity event occurs.

Figure 10:
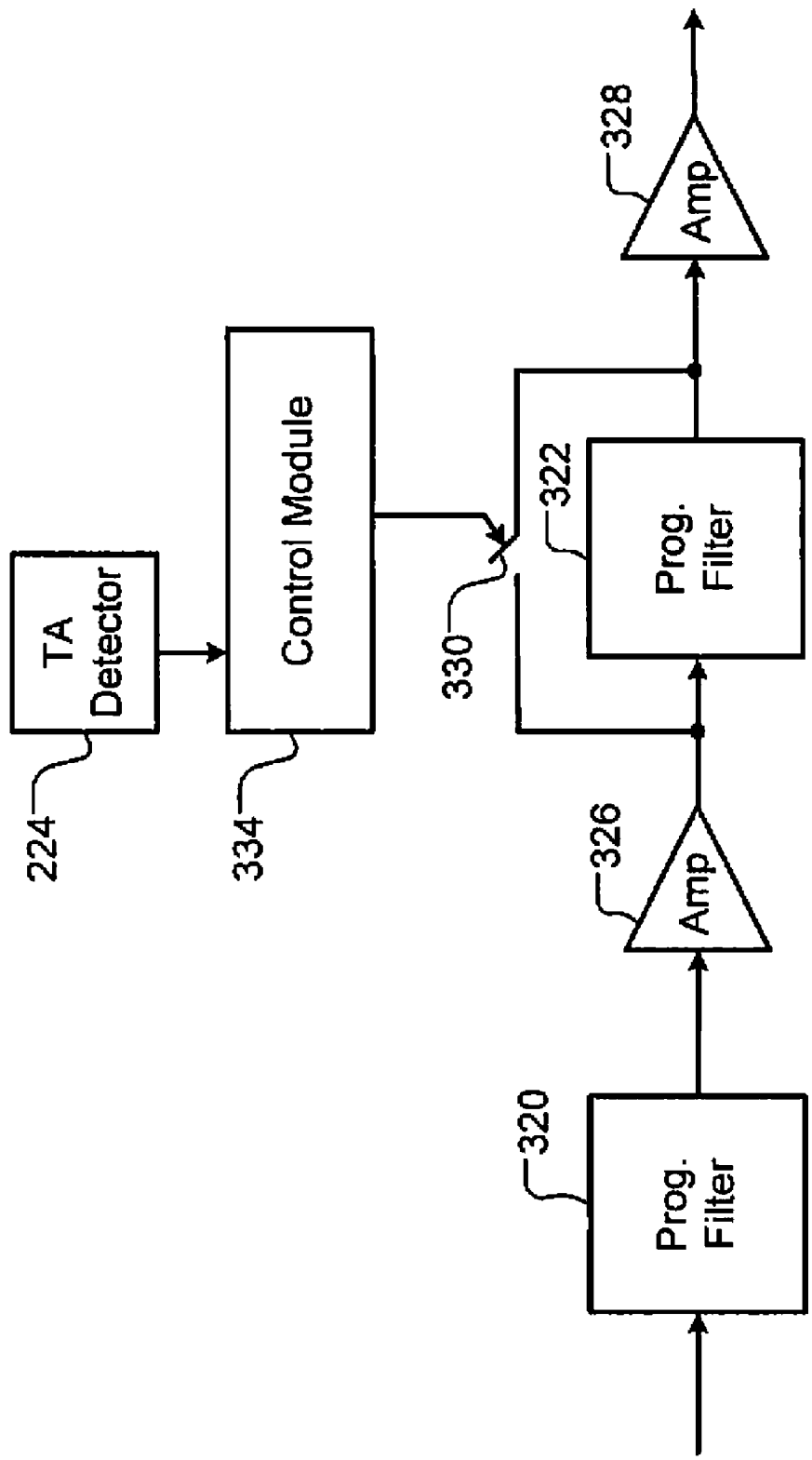
FIG. 10 illustrates an AC/DC coupling including first and second programmable filters according to still another implementation.

Referring now to FIG. 10, an AC/DC coupling including first and second programmable filters 320 and 322 according to still another implementation is shown. Amplifiers 326 and 328 may be provided at outputs of the programmable filters 320 and 322, respectively. A switch 330 selectively shorts the second programmable filter 322. The first and second programmable filters 320 and 322 may have a series configuration rather than a parallel configuration shown and described above. A control module 334 selectively opens the switch 330 when thermal asperity events occur.

In use, the programmable filter 320 provides the function of the first programmable filter as described above in conjunction with FIG. 9 and/or other FIGs. In other words, in some implementations the first programmable filter 320 provides a moderate HP corner during a servo mode and a DC coupled channel during the user data. The second programmable filter 322 provides a programmable moderate corner (user determined). During thermal asperity events, the signal is passed through the second programmable filter by opening the switch 330. When the thermal asperity subsides, the switch 330 can be opened. This approach further reduces settling times.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A communications circuit, comprising:
   at least one filter having a first corner frequency and configured to (i) direct current (DC) couple a channel based on the first corner frequency and (ii) receive data;
   a data module configured to (i) identify a first type of data and a second type of data and (ii) generate a data identification signal, wherein the data identification signal indicates whether the data is the first type of data or the second type of data; and
   a control module configured to adjust the first corner frequency to provide DC coupling based on at least one of the data identification signal or a thermal asperity event.

2. The communications circuit of claim 1, wherein the thermal asperity event includes a read head colliding with a magnetic medium.

3. The communications circuit of claim 1, wherein the at least one filter comprises:
   a first filter having the first corner frequency and configured to DC couple the channel; and
   a second filter having a second corner frequency and configured to alternating current (AC) couple the channel.

4. The communications circuit of claim 3, further comprising a selector configured to select one of the first filter and the second filter based on the at least one of the data identification signal or the thermal asperity event.

5. The communications circuit of claim 4, wherein the selector is configured to select:
the first filter when the data identification signal indicates that the data is servo data; and
the second filter when at least one of the data identification signal indicates that the data is user data or the thermal asperity event is detected.

6. The communications circuit of claim 4, further comprising a thermal asperity detector configured to generate a thermal asperity signal, wherein the selector is configured to:
select the first filter when the thermal asperity signal is in a first state; and
select the second filter when the thermal asperity signal is in a second state.

7. The communications circuit of claim 3, wherein the control module is configured to adjust the second corner frequency to remove effects of the thermal asperity event.

8. The communications circuit of claim 3, further comprising a switch, wherein:
the first filter is connected in series with the second filter;
the control module is configured to generate a control signal based on the at least one of the data identification signal or the thermal asperity event; and
the switch is configured to short at least one of the first filter or the second filter based on the control signal.

9. The communications circuit of claim 1, wherein the control module is configured to adjust the first corner frequency to provide DC coupling based on the data identification signal.

10. The communications circuit of claim 1, wherein the control module is configured to adjust the first corner frequency to provide DC coupling based on the data identification signal and the thermal asperity event.

11. The communications circuit of claim 1, wherein:
the first type of data is servo data; and
the second type of data is user data.

12. The communications circuit of claim 1, wherein the control module is configured to:
adjust the first corner frequency to provide alternating current (AC) coupling when the data is the first type of data; and
adjust the first corner frequency to provide the DC coupling when the data is the second type of data.

13. The communications circuit of claim 1, wherein the control module is configured to:
adjust the first corner frequency to a first value associated with sampling a DC offset when the data is the first type of data;
adjust the first corner frequency to a second value associated with holding the DC offset; and
the first value is less than the second value.

14. The communications circuit of claim 13, wherein:
the control module is configured to adjust the first corner frequency to a third value when at least one of the data is the second type of data or the thermal asperity event is detected; and
the first value is greater than the third value.

15. The communications circuit of claim 1, wherein:
the at least one filter comprises
a capacitance, and
a resistance;
at least one of the capacitance or the resistance is programmable; and
the control module is configured to adjust the first corner frequency by adjusting at least one of a capacitance value of the capacitance or a resistance value of the resistance.

16. The communications circuit of claim 1, wherein the at least one filter comprises:
a first programmable filter having the first corner frequency and configured to DC couple the channel, wherein the first programmable filter comprises
a first capacitance, and
a first resistance; and
a second programmable filter having a second corner frequency and configured to alternating current (AC) couple the channel, wherein the second programmable filter comprises
a second capacitance, and
a second resistance,
wherein the control module is configured to
selects either the first programmable filter or the second programmable filter via a selector based on the at least one of the data identification signal or the thermal asperity event,
programs the first programmable filter to adjust at least one of the first capacitance or the first resistance when the data is servo data, and
programs the second programmable filter to adjust at least one of the second capacitance or the second resistance when at least one of the data is user data or the thermal asperity event is detected.

17. The communications circuit of claim 1, wherein the channel is a read and write channel of a hard disk drive.

18. The communications circuit of claim 1, further comprising:
a selector; and
an amplifier configured to amplify an output signal of the at least one filter,
wherein the at least one filter comprises
a first filter, and
a second filter,
wherein the control module is configured to generate a control signal to select one of the first filter and the second filter based on the at least one of the data identification signal or a thermal asperity event, and
wherein the selector is configured to provide the output signal from one of the first filter and the second filter to the amplifier based on the control signal.

19. A hard disk drive comprising:
a magnetic medium; and
a preamplifier comprising the communications circuit of claim 1,
wherein the preamplifier is configured to record the data on the magnetic medium using perpendicular recording, wherein the perpendicular recording is performed based on the first corner frequency.

20. A hard disk drive comprising:
a magnetic medium; the channel of claim 1, wherein the channel is a read and write channel; and
a preamplifier,
wherein the channel comprises the communications circuit of claim 1, and
wherein the preamplifier is configured to record the data on the magnetic medium using perpendicular recording, wherein the perpendicular recording is performed based on the first corner frequency.

* * * * *